United States Patent [19]

Bailey et al.

[11] 4,440,848
[45] Apr. 3, 1984

[54] VINYL-ESTER POLYMERIC TIMING LAYER FOR COLOR TRANSFER ASSEMBLAGES

[75] Inventors: David B. Bailey; Edward P. Abel, both of Webster, N.Y.

[73] Assignee: Eastman Kodak Company, Rochester, N.Y.

[21] Appl. No.: 462,501

[22] Filed: Jan. 31, 1983

[51] Int. Cl.³ .................. G03C 1/40; G03C 5/54; G03C 1/76
[52] U.S. Cl. .................. 430/215; 430/505; 430/536
[58] Field of Search .................. 430/215, 536, 505

[56] References Cited

U.S. PATENT DOCUMENTS 4,123,275 10/1978 Karino et al. .................. 430/215
4,199,362 4/1980 Yoshida et al. .................. 430/215

Primary Examiner—Richard L. Schilling
Attorney, Agent, or Firm—Harold E. Cole

[57] ABSTRACT

Photographic assemblages, elements, receiving elements and cover sheets are described employing a novel timing layer comprising the following recurring units:

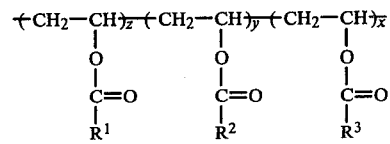

wherein
$R^1$ is a straight or branched chain alkyl group of from 1 to about 10 carbon atoms or aralkyl group of from about 7 to about 10 carbon atoms;
$R^2$ is a substituted or unsubstituted aryl group of from 6 to about 12 carbon atoms;
$R^3$ is a straight or branched aliphatic group having from 1 to about 20 carbon atoms or an aromatic group having from about 6 to about 20 carbon atoms, the group being substituted with at least one free carboxylic acid group, free sulfonic acid group, free phosphoric acid group or salt thereof;
x is from about 1 to about 30 weight percent; and
y+z is from about 99 to about 70 weight percent, the ratio of y:z ranging from about 15:85 to about 70:30.

The timing layer has a high activation energy and provides improved processing temperature latitude.

33 Claims, No Drawings

VINYL-ESTER POLYMERIC TIMING LAYER FOR COLOR TRANSFER ASSEMBLAGES

This invention relates to photography, and more particularly to photographic assemblages, elements, receiving elements and cover sheets for color diffusion transfer photography wherein a novel vinyl-ester polymeric timing layer is employed. This timing layer has a high activation energy and provides improved processing temperature latitude.

Various formats for color, integral transfer elements are described in the prior art, such as U.S. Pat. Nos. 3,415,644; 3,415,645; 3,415,646; 3,647,437; 3,635,707; 3,756,815, and Canadian Pat. Nos. 928,559 and 674,082. In these formats, the image-receiving layer containing the photographic image for viewing remains permanently attached and integral with the image generating and ancillary layers present in the structure when a transparent support is employed on the viewing side of the assemblage. The image is formed by dyes, produced in the image generating units, diffusing through the layers of the structure of the dye image-receiving layer. After exposure of the assemblage, an alkaline processing composition permeates the various layers to initiate development of the exposed photosensitive silver halide emulsion layers. The emulsion layers are developed in proportion to the extent of the respective exposures, and the image dyes which are formed or released in the respective image generating layers begin to diffuse throughout the structure. At least a portion of the imagewise distribution of diffusible dyes diffuse to the dye image-receiving layer to form an image of the original subject.

Other so-called "peel apart" formats for color diffusion transfer assemblages are described, for example, in U.S. Pat. Nos. 2,983,606; 3,362,819 and 3,362,821. In these formats, the image-receiving element is separated from the photosensitive element after development and transfer of the dyes to the image-receiving layer.

In color transfer assemblages such as those described above, a "shut-down" mechanism is needed to stop development after a predetermined time, such as 20 to 60 seconds in some formats, or up to 3 minutes or more in other formats. Since development occurs at a high pH, it is rapidly slowed by merely lowering the pH. The use of a neutralizing layer, such as a polymeric acid, can be employed for this purpose, which will stabilize the element after the required diffusion of dyes has taken place. A timing layer is usually employed in conjunction with the neutralizing layer, so that the pH is not prematurely lowered, which would stop or restrict development. The development time is thus established by the time it takes the alkaline composition to penetrate through the timing layer. As the system starts to become stabilized, alkali is depleted throughout the structure, causing silver halide development to substantially cease in response to this drop in pH. For each image generating unit, this shutoff mechanism establishes the amount of silver halide development and the related amount of dye formed according to the respective exposure values.

In U.S. Pat. No. 4,123,275, timing layers are disclosed comprising a copolymer of a vinyl compound and an unsaturated monomer. Vinyl monomers disclosed include vinyl acetate and vinyl benzoate. Unsaturated monomers polymerizable with the vinyl compound include a variety of materials including vinyl esters. There is no disclosure in this patent, however, of the specific polymers of this invention or the specific amounts of each material employed.

In U.S. Pat. No. 4,199,362, timing layers are disclosed comprising a copolymer or terpolymer of an ethylene-type monomer having a free carboxylic acid group, free sulfonic acid group or a free phosphoric acid group or salt thereof with a variety of other monomers including vinyl acetate and vinyl benzoate. Again, however, there is no disclosure in this patent of the specific polymers of this invention or of the specific amounts of each material employed.

Not only does the "shut-down" mechanism described above involve a time factor, the interaction of time and temperature must also be considered since image transfer systems are required to operate over a wide temperature range. Thus, a major goal of a practical image transfer system is to have sensitometric values that do not vary with temperature.

Timing layers employed with the "shut-down" mechanism described above usually consist of balanced hydrophilic and hydrophobic components to optimize alkali penetration and layer swell. Timing layers having good swell characteristics in alkaline solutions are highly desirable in an effective timing layer.

Another desirable property of a timing layer is to have a sufficiently high glass transition temperature to avoid coating difficulties associated with tacky polymers.

Another desirable property of a timing layer is to have a high activation energy (see "Kinetics and Mechanism", 2nd Ed., John Wiley and Sons, N.Y., 1961, pp. 22-25) for the breakdown of the timing layer by alkaline processing compositions. Activation energy is a useful evaluator of the temperature function of timing layers—the more positive the activation energy, the more rapid the rate of alkali penetration as the processing temperature is increased.

It would be desirable to provide timing layers which have higher activation energies than those of the prior art, yet retaining other desirable physical properties such as good swell characteristics and a sufficiently high glass transition temperature. These and other desirable properties of a timing layer are provided by our invention.

In accordance with our invention, there is provided a photographic assemblage comprising:

(a) a photosensitive element comprising a support having thereon at least one photosensitive silver halide emulsion layer having associated therewith a dye image-providing material;

(b) a dye image-receiving layer;

(c) a neutralizing layer for neutralizing an alkaline processing composition; and (d) a timing layer comprising a polymer located between the neutralizing layer and the dye image-receiving layer;

and wherein the polymer comprises:

(i) from about 1 to about 30 weight percent of a hydrophilic component comprising a polymerized monovinyl ester of a polybasic acid, and (ii) the balance comprising a hydrophobic component comprising a polymerized alkyl vinyl ester and a polymerized aryl vinyl ester.

In a preferred embodiment of our invention, the polymeric timing layer comprises the following recurring units:

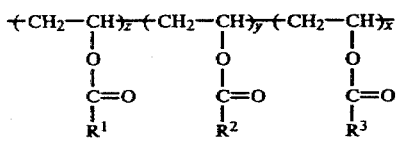

wherein
R[1] is a straight or branched chain alkyl group of from 1 to about 10 carbon atoms or aralkyl group of from about 7 to about 10 carbon atoms;
R[2] is a substituted or unsubstituted aryl group of from 6 to about 12 carbon atoms;
R[3] is a straight or branched aliphatic group having from 1 to about 20 carbon atoms or an aromatic group having from about 6 to about 20 carbon atoms, the group being substituted with at least one free carboxylic acid group, free sulfonic acid group, free phosphoric acid group or salt thereof;
x is from about 1 to about 30, preferably 1 to 15, weight percent; and
y+z is from about 99 to about 70, preferably 85 to 99, weight percent, the ratio of y:z ranging from about 15:85 to about 70:30.

R[1] in the above formula may be a straight or branched chain alkyl group having from 1 to about 10 carbon atoms or an aralkyl group having from about 7 to about 10 carbon atoms, such as methyl, ethyl, propyl, isopropyl, butyl, hexyl, decyl, benzyl, phenethyl, phenylpropyl, phenylbutyl or tolylethyl. These alkyl or aralkyl groups can also be substituted with substituents as long as they do not interfere with the desired properties of the resultant polymer. In a preferred embodiment of our invention, R[1] is methyl, ethyl or propyl. In a highly preferred embodiment, R[1] is methyl which provides a high activation energy for the polymer.

R[2] in the above formuula may be a substituted or unsubstituted aryl group having from 6 to about 12 carbon atoms, such as phenyl, chlorophenyl, cyanophenyl, tolyl, xylyl, mesityl, anisyl, 1-naphthyl, 2-naphthyl, methoxyaryl or biphenylyl. In a preferred embodiment of our invention, R[2] is phenyl, chlorophenyl or cyanophenyl. In a highly preferred embodiment, R[2] is phenyl which provides a sufficiently high glass transition temperature, and extends the inherent high activation energy region of the polymer to higher temperatures and avoids coating difficulties associated with tacky polymers.

As noted above, R[3] in the above formula may be a straight or branched aliphatic group having from 1 to about 20 carbon atoms or an aromatic group having from about 6 to about 20 carbon atoms, the group being substituted with at least one free carboxylic acid group, free sulfonic acid group, free phosphoric acid group or salt thereof. Examples of such groups include carboxyethyl, carboxypropyl, carboxybutyl, carboxypentyl, carboxyhexyl, carboxyheptyl, carboxyoctyl, carboxyhendecyl, carboxyoctadecyl, 2,3-dicarboxypropyl or sulfophenyl.

In a preferred embodiment of our invention, R[3] is carboxybutyl, carboxyhexyl or carboxyethyl. In a highly preferred embodiment, R[3] is carboxybutyl which provides good swell characteristics for the polymer.

The polymer of the invention thus provides a timing layer that has improved processing temperature latitude. Also, by varying the ratio of the various components of the polymer, its activation energy and timing layer breakdown (penetration time by alkaline processing composition) can also be changed. Most timing layers of the prior art have activation energies in the 10-15 kcal/mole range, with very few having activation energies greater than 20 kcal/mole. The polymers of our invention, however, have activation energies in the range of 27 to 36 kcal/mole.

While the polymers of our invention are most preferably polymers, other additional monomers may also be employed in the polymer chain as long as the percentage amounts in the formula described above are satisfied, and as long as such additional monomer does not alter the basic desirable properties described above.

Our polymers are easily and reproducibly synthesized. The hydrophobic and hydrophilic portions are homogeneous, form a single phase to avoid channelling, and are more stable than heterogeneous systems. The polymer has adequate solubility to permit coating from solvents such as acetone, 2-butanone or ethyl acetate. They may also be used in latex formulations. These polymers may be made with moderate glass transition temperatures, Tg, to give optically clear, flexible coatings. (Polymers with an excessively high Tg produce brittle layers that may crack, while polymers with a low Tg are tacky.)

The number average molecular weights for the polymers of our invention range from 10,000 to 500,000, preferably 40,000 to 100,000.

Specific polymers included within the scope of our invention include the following:

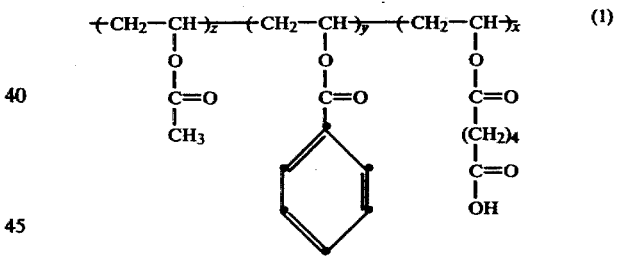

poly(vinyl acetate-co-vinyl benzoate-co-monovinyl adipate) having the following weight ratios for z, y and x: 72/18/10, 73/18/9, 52/35/13, 51/34/15, 33/50/17, 33/49/18, 16/65/19 and 16/64/20.

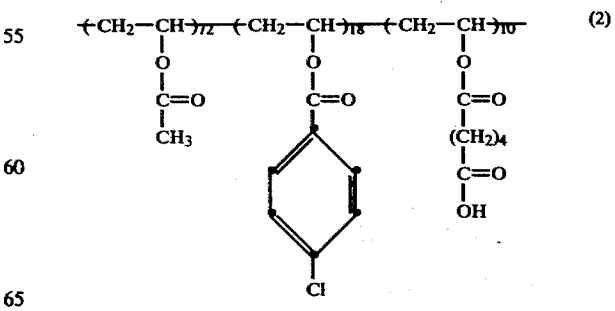

poly(vinyl acetate-co-vinyl 4-chlorobenzoate-co-monovinyl adipate) (wt. 72/18/10).

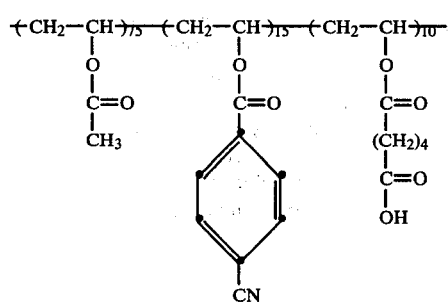

poly(vinyl acetate-co-vinyl 4-cyanobenzoate-co-monovinyl adipate) (wt. ratio 75/15/10).

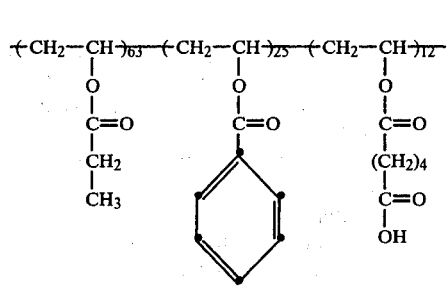

poly(vinyl propionate-co-vinyl benzoate-co-monovinyl adipate) (wt. ratio 63/25/12).

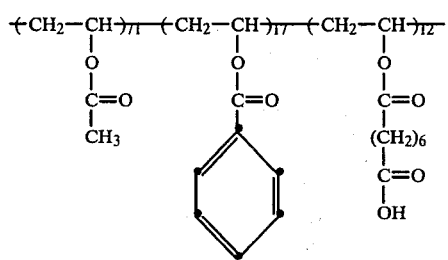

poly(vinyl acetate-co-vinyl benzoate-co-monovinyl suberate) (wt. ratio 71/17/12).

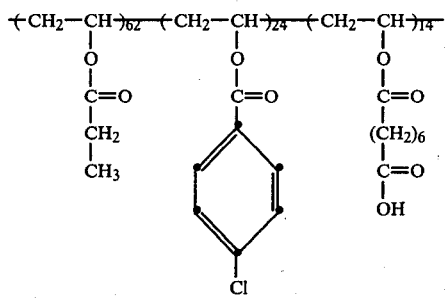

poly(vinyl propionate-co-vinyl 4-chlorobenzoate-co-monovinyl suberate) (wt. ratio 62/24/14).

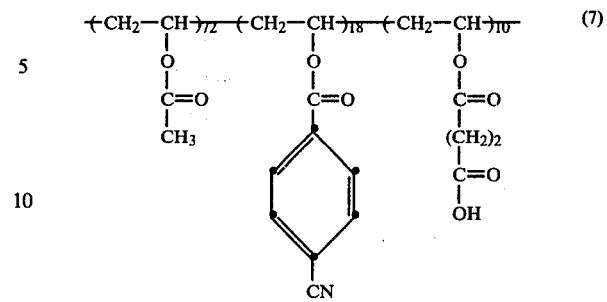

poly(vinyl acetate-co-vinyl 4-cyanobenzoate-co-monovinyl succinate) (wt. ratio 72/18/10).

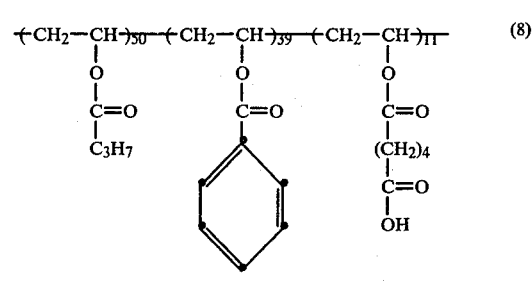

poly(vinyl butyrate-co-vinyl benzoate-co-mono-vinyl adipate) (wt. ratio 50/39/11).

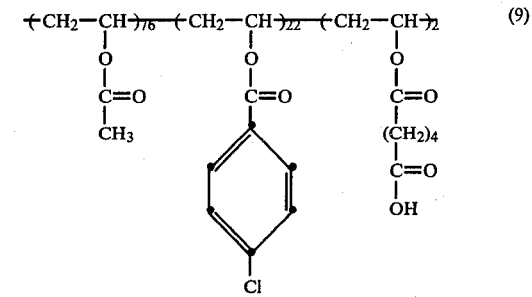

poly(vinyl acetate-co-vinyl 4-chlorobenzoate-co-monovinyl adipate) (wt. ratio 76/22/2).

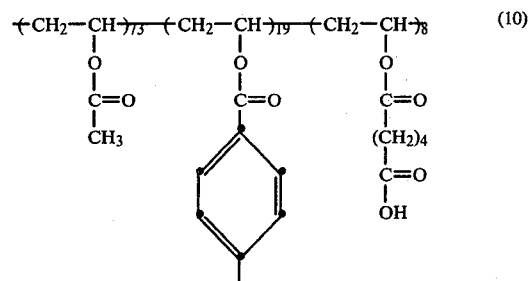

poly(vinyl acetate-co-vinyl 4-chlorobenzoate-co-monovinyl adipate) (wt. ratio 73/19/9).

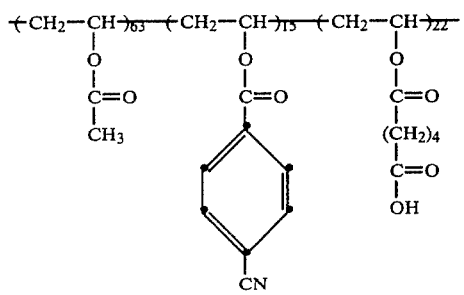

poly(vinyl acetate-co-vinyl 4-cyanobenzoate-co-monovinyl adipate) (wt. ratio 63/15/22).

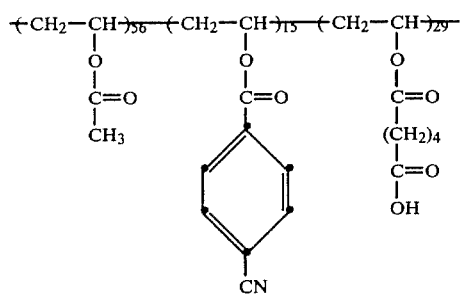

poly(vinyl acetate-co-vinyl 4-cyanobenzoate-co-monovinyl adipate) (wt. ratio 56/15/29).

The dye image-providing material useful in this invention is either positive- or negative-working, and is either initially mobile or immobile in the photographic element during processing with an alkaline composition. Examples of initially mobile, positive-working dye image-providing materials useful in this invention are described in U.S. Pat. Nos. 2,983,606; 3,536,739; 3,705,184; 3,482,972; 2,756,142; 3,880,658 and 3,854,985. Examples of negative-working dye image-providing materials useful in this invention include conventional couplers which react with oxidized aromatic primary amino color developing agents to produce or release a dye such as those described, for example, in U.S. Pat. No. 3,227,550 and Canadian Pat. No. 602,607. In a preferred embodiment of this invention, the dye image-providing material is a ballasted, redox-dye-releasing (RDR) compound. Such compounds are well known to those skilled in the art and are, generally speaking, compounds which will react with oxidized or unoxidized developing agent or electron transfer agent to release a dye. Such nondiffusible RDR's include negative-working compounds, as described in U.S. Pat. Nos. 3,728,113 of Becker et al; 3,725,062 of Anderson and Lum; 3,698,897 of Gompf and Lum; 3,628,952 of Puschel et al; 3,443,939 and 3,443,940 of Bloom et al; 4,053,312 of Fleckenstein; 4,076,529 of Fleckenstein et al; 4,055,428 of Koyama et al; 4,149,892 of Deguchi et al; 4,198,235 and 4,179,291 of Vetter et al; *Research Disclosure* 15157, November, 1976 and *Research Disclosure* 15654, April, 1977. Such nondiffusible RDR's also include positive-working compounds, as described in U.S. Pat. Nos. 3,980,479; 4,139,379; 4,139,389; 4,199,354; 4,232,107, 4,199,355 and German Pat. No. 2,854,946, the disclosures of which are hereby incorporated by reference.

In a preferred embodiment of this invention, positive-working quinone RDR's, are employed and the photographic element contains an incorporated reducing agent as described in U.S. Pat. No. 4,139,379, referred to above. In this embodiment, the positive-working quinone RDR compound as incorporated in a photographic element is incapable of releasing a diffusible dye. However, during photographic processing under alkaline conditions, the compound is capable of accepting at least one electron (i.e., being reduced) and thereafter releases a diffusible dye. Further details are found in U.S. Pat. No. 4,139,379, the disclosure of which is hereby incorporated by reference.

In another preferred embodiment, the quinone RDR's have the formula:

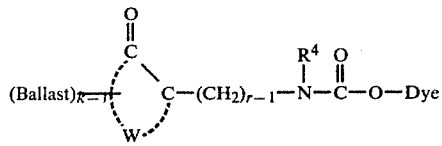

wherein:

Ballast is an organic ballasting radical of such molecular size and configuration as to render the compound nondiffusible in the photographic element during development in an alkaline processing composition;

W represents at least the atoms necessary to complete a quinone nucleus;

r is a positive integer of 1 to 2;

$R^4$ is an alkyl radical having 1 to about 40 carbon atoms or an aryl radical having 6 to about 40 carbon atoms;

k is a positive integer of 1 to 2 and is 2 when $R^4$ is a radical of less than 8 carbon atoms; and Dye is an organic dye or dye precursor moiety.

The photographic element in the above-described photographic assemblage is treated with an alkaline processing composition to effect or initiate development in any manner. One method for applying processing composition is by interjecting processing solution with communicating members similar to hypodermic syringes which are attached either to a camera or camera cartridge. The processing composition can also be applied by means of a swab or by dipping in a bath, if so desired. Another method of applying processing composition to a film assemblage which can be used in this invention is the liquid spreading means described in U.S. application Ser. No. 143,230 of Columbus, filed Apr. 24, 1980.

In a preferred embodiment of the invention, the assemblage itself contains the alkaline processing composition and means containing same for discharge within the film unit. There can be employed, for example, a rupturable container which is adapted to be positioned during processing of the film unit so that a compressive force applied to the container by pressure-applying members, such as would be found in a camera designed for in-camera processing, will effect a discharge of the container's contents within the film unit.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. In accordance with this embodiment of the invention, the dye image-receiving element would comprise a support having thereon, in sequence, a neutralizing layer, a timing layer as described previously, and a dye image-receiving layer. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above described film assemblage in another embodiment is located integral with the photographic element and is located between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer, and dye images, formed as a function of development, diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is employed is disclosed in Canadian Pat. No. 928,559. In this embodiment, the support for the photographic element is transparent and is coated with the image-receiving layer, a substantially opaque, light-reflective layer and the photosensitive layer or layers described above. A rupturable container, containing an alkaline processing composition and an opacifier, is positioned between the top layer and a transparent cover sheet which has thereon, a neutralizing layer and a timing layer, as previously described. The film unit is placed in a camera, exposed through the transparent cover sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images, formed as a result of development, diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also contains a neutralizing layer and a timing layer, as described above, underneath the dye image-receiving layer.

In another embodiment of the invention, the neutralizing layer and a timing layer as described above is located underneath the photosensitive layer or layers. In that embodiment, the photographic element would comprise a support having thereon, in sequence, a neutralizing layer and a timing layer, as described above, and at least one photosensitive silver halide emulsion layer having associated therewith a dye image-providing material. A dye image-receiving layer would be provided on a second support with the processing composition being applied therebetween. This format could either be integral, as described above, or peel-apart such as the two sheet image transfer elements described previously.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

A process for producing a photographic transfer image in color according to the invention from an imagewise exposed photosensitive element comprising a support having thereon at least one photosensitive silver halide emulsion layer having associated therewith a dye image-providing material comprises treating the element with an alkaline processing composition in the presence of a silver halide developing agent to effect development of each of the exposed silver halide emulsion layers. The processing composition contacts the emulsion layer or layers prior to contacting a neutralizing layer and a timing layer as described above. An imagewise distribution of dye image-providing material is thus formed as a function of development, and at least a portion of it diffuses to a dye image-receiving layer to provide the transfer image.

The film unit or assemblage of the present invention is used to produce positive images in single or multicolors. In a three-color system, each silver halide emulsion layer of the film assembly will have associated therewith a dye image-providing material which possesses a predominant spectral absorption within the region of the visible spectrum to which said silver halide emulsion is sensitive, i.e., the blue-sensitive silver halide emulsion layer will have a yellow dye image-providing material associated therewith, the green-sensitive silver halide emulsion layer will have a magenta dye image-providing material associated therewith and the red-sensitive silver halide emulsion layer will have a cyan dye image-providing material associated therewith. The dye image-providing material associated with each silver halide emulsion layer is contained either in the silver halide emulsion layer itself or in a layer contiguous to the silver halide emulsion layer, i.e., the dye image-providing material can be coated in a separate layer underneath the silver halide emulsion layer with respect to the exposure direction.

The concentration of the dye image-providing material that is employed in the present invention can be varied over a wide range, depending upon the particular compound employed and the results desired. For example, the dye image-providing material coated in a layer at a concentration of 0.1 to 3 g/m² has been found to be useful. The dye image-providing material is dispersed in a hydrophilic film forming natural material or synthetic polymer, such as gelatin, polyvinyl alcohol, etc, which is adapted to be permeated by aqueous alkaline processing composition.

A variety of silver halide developing agents are useful in this invention. Specific examples of developers or electron transfer agents (ETA's) useful in this invention include hydroquinone compounds, such as hydroquinone, 2,5-dichlorohydroquinone or 2-chlorohydroquinone; aminophenol compounds, such as 4-aminophenol, N-methylaminophenol, N,N-dimethylaminophenol, 3-methyl-4-aminophenol or 3,5-dibromoaminophenol; catechol compounds, such as catechol, 4-cyclohexylcatechol, 3-methoxycatechol, or 4-(N-octadecylamino)-catechol; phenylenediamine compounds, such as N,N,N',N'-tetramethyl-p-phenylenediamine. In highly preferred embodiments, the ETA is a 3-pyrazolidinone compound, such as 1-phenyl-3-pyrazolidinone (Phenidone®), 1-phenyl-4,4-dimethyl-3-pyrazolidinone (Dimezone®), 4-hydroxymethyl-4-methyl-1-phenyl-3-pyrazolidinone, 4-hydroxymethyl-4-methyl-1-p-tolyl-3-pyrazolidinone, 4-hydroxymethyl-4-methyl-1-(3,4-xylyl)-3-pyrazolidinone, 1-m-tolyl-3-pyrazolidinone, 1-p-tolyl-3-pyrazolidinone, 1-phenyl-4-methyl-3-pyrazolidinone, 1-phenyl-5-methyl-3-pyrazolidinone, 1-phenyl-4,4-dihydroxymethyl-3-pyrazolidinone, 1,4-dimethyl-3-pyrazolidinone, 4-methyl-3-pyrazolidinone, 4,4-dimethyl-3-pyrazolidinone, 1-(3-chlorophenyl)-4-methyl-3-pyrazolidinone, 1-(4-chlorophenyl)-4-methyl-3-pyrazolidinone, 1-(3-chlorophenyl)-3-pyrazolidinone, 1-(4-chlorophenyl)-3-pyrazolidinone, 1-(4-tolyl)-4-methyl-3-pyrazolidinone, 1-(2-tolyl)-4-methyl-3-pyrazolidinone, 1-(4-tolyl)-3-pyrazolidinone, 1-(3-tolyl)-3-pyrazolidinone, 1-(3-tolyl)-4,4-dimethyl-3-pyrazolidinone, 1-(2-trifluoroethyl)-4,4-dimethyl-3-pyrazolidinone or 5-methyl-3-pyrazolidinone. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In the invention, dye image-providing materials can be used which produce diffusible dye images as a function of development. Either conventional negative-working or direct-positive silver halide emulsions are employed. If the silver halide emulsion employed is a direct-positive silver halide emulsion, such as an internal image emulsion designed for use in the internal image reversal process, or a fogged, direct-positive emulsion such as a solarizing emulsion, which is developable in unexposed areas, a positive image can be obtained on the dye image-receiving layer by using ballasted, negative-working RDR's. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject.

Internal image silver halide emulsions useful in this invention are described more fully in the November, 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Any material is useful as the dye image-receiving layer in this invention, as long as the desired function of mordanting or otherwise fixing the dye images is obtained. The particular material chosen will, of course, depend upon the dye to be mordanted. Suitable materials are disclosed on pages 80 through 82 of the November, 1976 edition of *Research Disclosure*, the disclosure of which is hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbition. Suitable materials and their functioning are disclosed on pages 22 and 23 of the July 1974 edition of *Research Disclosure*, and pages 35 through 37 of the July 1975 edition of *Research Disclosure*, the disclosures of which are here incorporated by reference.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November, 1976 edition of *Research Disclosure*, the disclosure of which is hereby incorporated by reference.

The alkaline solution permeable, substantially opaque, light-reflective layer employed in certain embodiments of photographic film units used in this invention is described more fully in the November, 1976 edition of *Research Disclosure*, page 82, the disclosure of which is hereby incorporated by reference.

The supports for the photographic elements used in this invention can be any material, as long as it does not deleteriously affect the photographic properties of the film unit and is dimensionally stable. Typical flexible sheet materials are described on page 85 of the November, 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. patent application Ser. No. 184,714, filed Sept. 8, 1980.

The silver halide emulsions useful in this invention, both negative-working and direct-positive ones, are well known to those skilled in the art and are described in *Research Disclosure*, Volume 176, December, 1978, Item 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

*Research Disclosure* is a publication of Industrial Opportunities Ltd.; Homewell, Havant; Hampshire, P09 1EF, United Kingdom.

The term "nondiffusing" used herein has the meaning commonly applied to the term in photography and denotes materials that for all practical purposes do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property o diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1

Synthesis of Poly(vinyl acetate-co-vinyl benzoate-co-monovinyl adipate) (wt. ratio: 72/18/10)

A mixture of vinyl acetate (1.51 g), vinyl benzoate (6.05 g), monovinyl adipate (0.84 g), and 2,2'-azobis(2-methylpropionitrile) (14 mg) as an initiator was dissolved in dioxane (3 g), purged with nitrogen, and sealed in a glass vial. After heating for 16 hours at 60° C. in a water bath, the contents of the vial were diluted with acetone (5 ml) and the polymer was precipitated by addition to 200 ml of 1:1 ether:ligroin. The liquid was decanted, the solid polymer was kneaded with fresh ligroin and the liquid was again decanted. The polymer was spread on a glass plate and dried for 72 hours at 55° C. at reduced pressure (20 mm Hg). The yield of solid was 4.0 g; $M_n$ (number average molecular weight) 54,000; $M_w$ (weight average molecular weight) 383,000.

EXAMPLE 2

Synthesis of Poly(vinyl acetate-co-vinyl benzoate-co-monovinyl adipate) (wt. ratio: 51/34/15)

A mixture of vinyl acetate (4.28 g), vinyl benzoate (2.85 g), monovinyl adipate (1.26 g), and 2,2'-azobis(2-methylpropionitrile) (14 mg) was dissolved in dioxane (3.6 g), purged with nitrogen, and sealed in a glass vial. The tube was heated and treated as described in Example 1. The yield of polymer obtained after drying at 50° C. at reduced pressure (20 mm Hg) for 16 hours was 2.7 g; $M_n$ 45,000; $M_w$ 137,000.

EXAMPLE 3

Synthesis of Poly(vinyl acetate-co-vinyl benzoate-co-monovinyl adipate) (wt. ratio: 73/18/09)

A mixture of vinyl acetate (291.2 g), vinyl benzoate (72.8 g), and monovinyl adipate (36.0 g), ethyl acetate (267 g) and 2,2'-azobis(2-methylpropionitrile) (0.4 g) was heated in a 3-neck round bottom flask under reflux for 3 hours at 78°–80° C. under an argon atmosphere. After 16 hours at room temperature, an additional portion of 2,2'-azobis(2-methylpropionitrile) (0.4 g) was added and the mixture was heated at 80° C. for one more hour. The solution was then diluted with acetone (2000 ml) and the polymer was precipitated with addition of 1:1 ether:ligroin (7000 ml). The liquid was decanted and the soft polymer was spread on a Teflon ® sheet and dried for 7 hours at 55° C. at reduced pressure (20 mm Hg). The yield of polymer was 276 g with an inherent viscosity, $\eta$, of 0.87 (as measured at 25° C. in acetone, concentration=0.25 g/dl); $M_n$ 89,000; $M_w$ 617,000.

Another preparation involving proportionately higher initiator (0.75 g) for only 37.8 percent of the amount of each monomer listed above, yielded 107 g of polymer with an intrinsic viscosity of 0.40; $M_n$ 43,000; $M_w$ 245,000. This shows that the inherent viscosity of these polymers can be substantially increased by decreasing the initiator without altering the yield.

The procedures outlined in these three Examples were used for production of the polymers of the invention having the following vinyl acetate/vinyl benzoate/monovinyl adipate weight ratios: 16/64/20, 17/68/15, 18/72/10, 19/76/05, 32/48/20, 34/51/15, 36/54/10, 38/57/05, 51/34/15, 57/38/05, 57/33/10, 70/18/12, 71/18/11, 72/18/10, 73/18/09, 74/19/07, 74/18/08 and 76/19/05.

EXAMPLE 4

TLB and Activation Energy Measurements

This example shows timing layer breakdown (TLB) and activation energy data on a model system for various polymers of the invention.

The following layers were coated on a transparent poly(ethylene terephthalate) film support:
(1) Indicator layer of thymolphthalein (0.2 g/m²) in gelatin (6.6 g/m²), and
(2) Timing layer as shown in Table 1 at various coverages coated from a 2.5 to 5.0 percent tetrahydrofuran solution.

Each test coating was held by vacuum on a controlled temperature coating block and a drop of 1.0 N sodium hydroxide was placed on the surface. The time required for the alkaline area to change color to blue (increasing to a pH greater than approximately 8) was considered to be a relative estimate of the time within which the layer would function as a timing layer in a photographic system.

The activation energy, Ea, of these timing layers was estimated by obtaining timing layer breakdowns (TLB's) from 13° C. to 61° C. and determining the slope of a plot of TLB versus 1/T(°K.), as described in Hannie and Ducharme U.S. Pat. No. 4,061,496, issued Dec. 6, 1977.

The following results were obtained.

TABLE 1

| Poly(vinyl acetate-co-vinyl benzoate-co-monovinyl adipate) (weight ratio) | Approx. Coverage (g/m²) | Ea (kcal/mole) | TLB (sec) |
|---|---|---|---|
| 72/18/10 | 6.5 | 36 | 410 |

TABLE 1-continued

| Poly(vinyl acetate-co-vinyl benzoate-co-monovinyl adipate) (weight ratio) | Approx. Coverage (g/m²) | Ea (kcal/mole) | TLB (sec) |
|---|---|---|---|
| 51/34/15 | 3.7 | 29 | 210 |
| 52/34/14 | 3.4 | 29 | 320 |
| 33/49/18 | 5.0 | 27 | 420 |
| 32/49/19 | 4.5 | 27 | 220 |

EXAMPLE 5

Incubation Tests (A) A control cover sheet of the type described in U.S. Pat. No. 4,229,516 of Abel was prepared by coating the following layers in the order recited on a transparent poly(ethylene terephthalate) film support:

(1) neutralizing layer of 14 g/m² of poly(n-butyl acrylate-co-acrylic acid) (30:70 weight ratio) equivalent to 140 meq. acid/m²; and (2) timing layer of a 1:1 physical mixture of the following two polymers coated from an organic solvent at 4.8 g/m²;
  (a) poly(acrylonitrile-co-vinylidene chloride-co-acrylic acid) (weight ratio 14/79/7); and
  (b) a carboxy-ester-lactone formed by cyclization of a vinyl acetate-maleic anhydride copolymer in the presence of 1-butanol to produce a partial butyl ester, ratio of acid:ester of 15:85.

(B) A cover sheet according to the invention was prepared similar to (A) except that the timing layer (2) was poly(vinyl acetate-co-vinyl benzoate-co-monovinyl adipate) (wt. ratio 72/18/10) dissolved and coated from 2-butanone at 4.3 g/m².

An integral imaging-receiver (IIR) element was prepared by coating the following layers in the order recited on a transparent poly(ethylene terephthalate) film support. Quantities are parenthetically given in grams per square meter, unless otherwise stated.

(1) metal containing layer of nickel sulfate 0.6H₂O (0.58) and gelatin (1.1);

(2) image-receiving layer of poly(4-vinylpyridine) (2.2) and gelatin (2.2);

(3) reflecting layer of titanium dioxide (17) and gelatin (2.6);

(4) opaque layer of carbon black (1.9) and gelatin (1.3);

(5) interlayer of gelatin (1.2);

(6) red-sensitive, negative-working silver bromoiodide emulsion (1.4 silver), gelatin (1.6), cyan positive-working, redox dye-releaser (PRDR) (0.55), incorporated reducing agent (IRA) (0.29), and inhibitor (0.02);

(7) interlayer of gelatin (1.2), scavenger (0.65) and quinone (0.48);

(8) green-sensitive, negative-working, silver bromoiodide emulsion (1.4 silver), gelatin (1.6), magenta PRDR (0.58), incorporated reducing agent IRA (0.29), and inhibitor (0.007);

(9) interlayer of gelatin (1.1), scavenger (0.65) and quinone (0.48);

(10) blue-sensitive, negative-working silver bromoiodide emulsion (1.4 silver), gelatin (1.6), yellow PRDR (0.46), incorporated reducing agent IRA (0.45), and inhibitor (0.007); and

(11) overcoat layer of gelatin (0.98).

CYAN PRDR

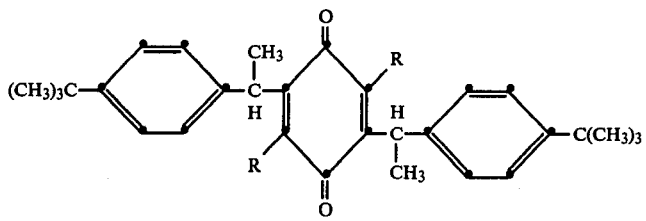
Where R =
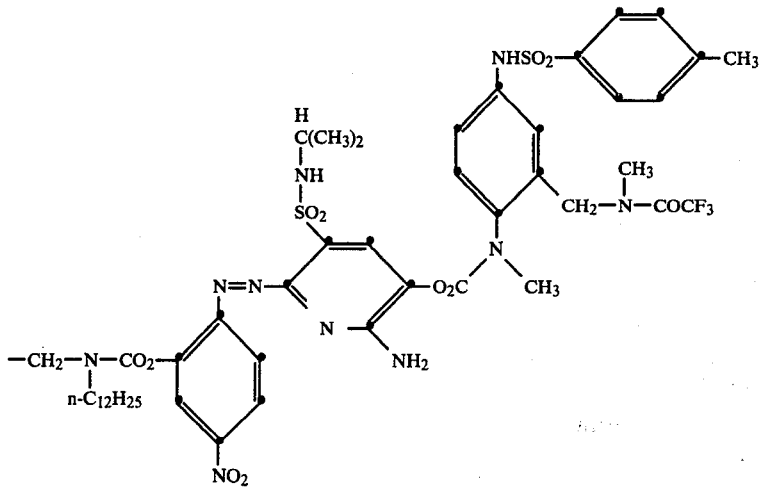
Dispersed in diethyllauramide (PRDR:solvent 2:1)
MAGENTA PRDR
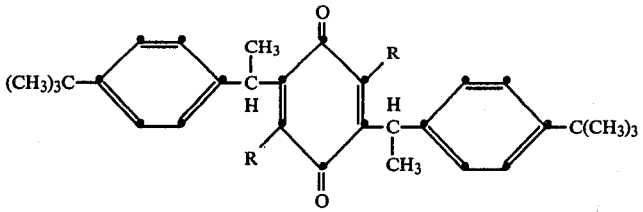
Where R =
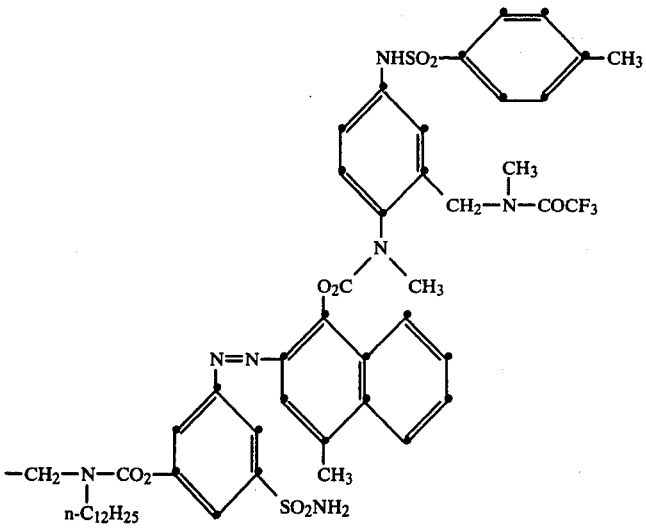
Dispersed in diethyllauramide (PRDR:solvent 1:1)
YELLOW PRDR

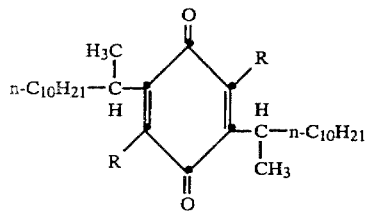
Where R =
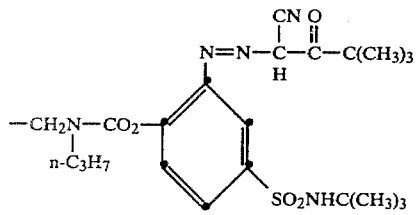
Dispersed in diethyllauramide (total solid:solvent 2:1)
IRA
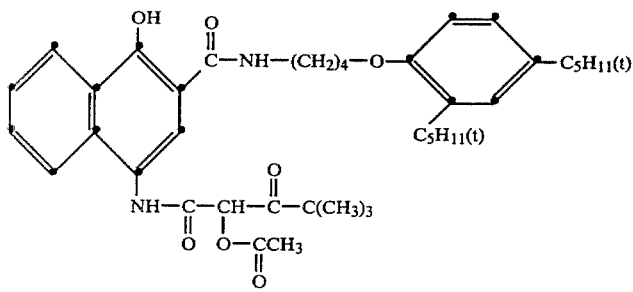
Dispersed in diethyllauramide (total solid:solvent 2:1)
INHIBITOR
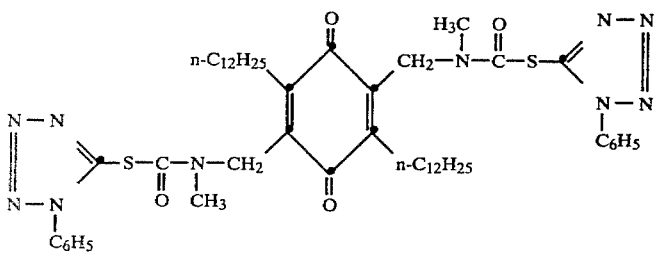
Dispersed in diethyllauramide (Total solid:solvent 2:1)
SCAVENGER
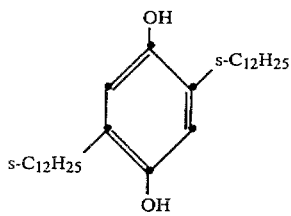
QUINONE

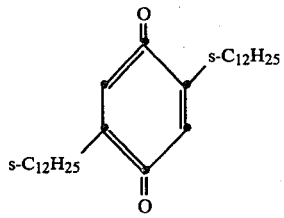

Samples of the imaging-receiver element were exposed in a sensitometer through a graduated density test object to yield a neutral at a Status A density of approximately 1.0. The exposed samples were then processed at about 21° C. by rupturing a pod containing the viscous processing composition described below between the imaging-receiver element and the cover sheets described above, by using a pair of juxtaposed rollers to provide a processing gap of about 65 μm.

The processing composition was as follows:
51 g potassium hydroxide
3.4 g sodium hydroxide
8 g 4-methyl-4-hydroxymethyl-1-p-tolyl-3-pyrazolidinone
10 g ethylenediaminetetraacetic acid, disodium salt dihydrate
0.5 g lead oxide
2 g sodium sulfite
2.2 g Tamol SN ® dispersant
10 g potassium bromide
56 g carboxymethylcellulose
172 g carbon water to 1 liter The maximum density ($D_{max}$) and minimum density ($D_{min}$) were obtained within 3 to 24 hours at different processing temperatures as set forth in Table 2. The following results were obtained:

TABLE 2

| Cover Sheet | Timing Layer | | $D_{max}$ | | |
|---|---|---|---|---|---|
| | | | 22° C. | 35° C. | Δ |
| A | Prior Art | R | 1.97 | 2.16 | +0.19 |
| | | G | 1.97 | 2.17 | +0.20 |
| | | B | 1.99 | 2.09 | +0.10 |
| B | Invention | R | 1.90 | 1.83 | −0.07 |
| | | G | 1.82 | 1.82 | 0 |
| | | B | 1 85 | 1.93 | +0.08 |
| | | | $D_{min}$ | | |
| | | | 22° C. | 35° C. | Δ |
| A | Prior Art | R | 0.26 | 0.33 | +0.07 |
| | | G | 0.34 | 0.41 | +0.07 |
| | | B | 0.33 | 0.45 | +0.12 |
| B | Invention | R | 0.23 | 0.28 | +0.05 |
| | | G | 0.28 | 0.30 | +0.02 |
| | | B | 0.30 | 0.40 | +0.10 |
| | | | $D_{min}$ | | |
| | | | 15.5° C. | 35° C. | Δ |
| A | Prior Art | R | 0.25 | 0.33 | +0.08 |
| | | G | 0.32 | 0.41 | +0.09 |
| | | B | 0.29 | 0.45 | +0.16 |
| B | Invention | R | 0.24 | 0.28 | +0.04 |
| | | G | 0.30 | 0.30 | 0 |
| | | B | 0.28 | 0.40 | +0.12 |

The above results indicate that use of the timing layer of the invention produces smaller $D_{min}$ and $D_{max}$ changes between 22° C. (72° F.) and 35° C. (95° F.) processing, i.e., it has an improved processing temperature latitude. $D_{min}$ stability is even more pronounced when the comparison is made between 15.5° C. (60° F.) and 35° C. (95° F.).

An additional benefit of use of the polymers of the invention is that the initial $D_{min}$s are lower than those of the prior art timing layer. These differences are believed to be attributable to the higher Ea of the polymers of the invention.

The invention has been described in detail with particular reference to preferred embodiments thereof, but it will be understood that variations and modifications can be effected within the spirit and scope of the invention.

What is claimed is:
1. In a photographic assemblage comprising:
   (a) a photosensitive element comprising a support having thereon at least one photosensitive silver halide emulsion layer having associated therewith a dye image-providing material;
   (b) a dye image-receiving layer;
   (c) a neutralizing layer for neutralizing an alkaline processing composition; and
   (d) a timing layer comprising a polymer located between said neutralizing layer and said dye image-receiving layer;
   the improvement wherein said polymer comprises:
   (i) from about 1 to about 30 weight percent of a hydrophilic component comprising a polymerized monovinyl ester of a polybasic acid, and
   (ii) the balance comprising a hydrophobic component comprising a polymerized alkyl vinyl ester and a polymerized aryl vinyl ester.

2. The assemblage of claim 1 wherein said polymer comprises the following recurring units:

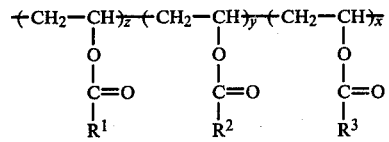

wherein
$R^1$ is a straight or branched chain alkyl group of from 1 to about 10 carbon atoms or aralkyl group of from about 7 to about 10 carbon atoms;
$R^2$ is a substituted or unsubstituted aryl group of from 6 to about 12 carbon atoms;
$R^3$ is a straight or branched aliphatic group having from 1 to about 20 carbon atoms or an aromatic group having from about 6 to about 20 carbon atoms, said group being substituted with at least one free carboxylic acid group, free sulfonic acid group, free phosphoric acid group or salt thereof;
x is from about 1 to about 30 weight percent; and
y+z is from about 99 to about 70 weight percent, the ratio of y:z ranging from about 15:85 to about 70:30.

3. The assemblage of claim 1 wherein $R^1$ is methyl, ethyl or propyl, $R^2$ is phenyl, chlorophenyl or cyanophenyl and $R^3$ is carboxybutyl, carboxyhexyl or carboxyethyl.

4. The assemblage of claim 1 wherein $R^1$ is methyl, $R^2$ is phenyl and $R^3$ is carboxybutyl.

5. In a photographic assemblage comprising:
   (a) a photosensitive element comprising a support having thereon at least one photosensitive silver halide emulsion layer having associated therewith a dye image-providing material;
   (b) a dye image-receiving layer;
   (c) an alkaline processing composition and means containing same for discharge within said assemblage;
   (d) a neutralizing layer for neutralizing said alkaline processing composition; and
   (e) a timing layer comprising a polymer located between said neutralizing layer and said dye image-receiving layer;
   the improvement wherein said polymer comprises:
      (i) from about 1 to about 30 weight percent of a hydrophilic component comprising a polymerized monovinyl ester of a polybasic acid, and
      (ii) the balance comprising a hydrophobic component comprising a polymerized alkyl vinyl ester and a polymerized aryl vinyl ester.

6. The assemblage of claim 5 wherein said polymer comprises the following recurring units:

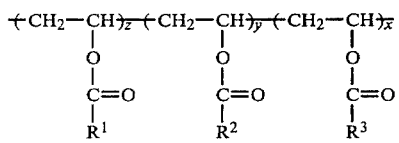

wherein
$R^1$ is a straight or branched chain alkyl group of from 1 to about 10 carbon atoms or aralkyl group of from about 7 to about 10 carbon atoms;
$R^2$ is a substituted or unsubstituted aryl group of from 6 to about 12 carbon atoms;
$R^3$ is a straight or branched aliphatic group having from 1 to about 20 carbon atoms or an aromatic group having from about 6 to about 20 carbon atoms, said group being substituted with at least one free carboxylic acid group, free sulfonic acid group, free phosphoric acid group or salt thereof;
x is from about 1 to about 30 weight percent; and
y+z is from about 99 to about 70 weight percent, the ratio of y:z ranging from about 15:85 to about 70:30.

7. The assemblage of claim 5 wherein $R^1$ is methyl, ethyl or propyl, $R^2$ is phenyl, chlorophenyl or cyanophenyl and $R^3$ is carboxybutyl, carboxyhexyl or carboxyethyl.

8. The assemblage of claim 5 wherein $R^1$ is methyl, $R^2$ is phenyl and $R^3$ is carboxybutyl.

9. The assemblage of claim 5 wherein:
   (a) said dye image-receiving layer is located in said photosensitive element between said support and said silver halide emulsion layer; and
   (b) said assemblage also includes a transparent cover sheet over the layer outermost from said support.

10. The assemblage of claim 9 wherein said transparent cover sheet is coated with, in sequence, said neutralizing layer and said timing layer.

11. The assemblage of claim 10 wherein said discharging means is a rupturable container containing said alkaline processing composition and an opacifying agent, said container being so positioned during processing of said assemblage that a compressive force applied to said container will effect a discharge of the container's contents between said transparent sheet and the layer outermost from said support.

12. The assemblage of claim 5 wherein said support of said photosensitive element is opaque, and said dye image-receiving layer is located on a separate transparent support superposed on the layer outermost from said opaque support.

13. The assemblage of claim 12 wherein said transparent support has thereon, in sequence, said neutralizing layer, said timing layer and said dye image-receiving layer.

14. The assemblage of claim 12 wherein said opaque support has thereon, in sequence, said neutralizing layer, said timing layer and said silver halide emulsion layer.

15. The assemblage of claim 5 wherein said dye image-providing material is a positive-working redox dye-releaser.

16. The assemblage of claim 15 wherein said positive-working redox dye-releaser is a quinone redox dye-releaser and said photosensitive element contains an incorporated reducing agent.

17. The assemblage of claim 16 wherein said quinone redox dye-releaser has the formula:

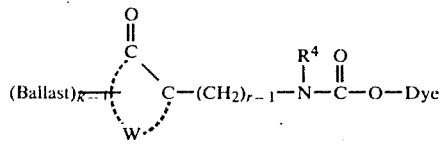

wherein:
Ballast is an organic ballasting radical of such molecular size and configuration as to render said compound nondiffusible in said photosensitive element during development in said alkaline processing composition;
W represents at least the atoms necessary to complete a quinone nucleus;
r is a positive integer of 1 or 2;
$R^4$ is an alkyl radical having 1 to about 40 carbon atoms or an aryl radical having 6 to about 40 carbon atoms;
k is a positive integer of 1 to 2 and is 2 when $R^4$ is a radical of less than 8 carbon atoms; and
Dye is an organic dye or dye precursor moiety.

18. The assemblage of claim 5 wherein said photosensitive element comprises a support having thereon a red-sensitive silver halide emulsion layer having a cyan dye image-providing material associated therewith, a green-sensitive silver halide emulsion layer having a magenta dye image-providing material associated therewith, and a blue-sensitive silver halide emulsion layer having a yellow dye-image-providing material associated therewith.

19. An integral photographic assemblage comprising:
   (a) a photosensitive element comprising a transparent support having thereon the following layers in sequence: a dye image-receiving layer; an alkaline solution-permeable, light-reflective layer; an alkaline solution-permeable, opaque layer; a red-sensitive, negative-working silver halide emulsion layer having a positive-working redox cyan dye-releaser associated therewith; a green-sensitive, negative-working silver halide emulsion layer having a positive-working redox magenta dye-releaser associated therewith; and a blue-sensitive, negative-working silver halide emulsion layer having a positive-working redox yellow dye-releaser associated therewith;

(b) a transparent cover sheet superposed over said blue-sensitive silver halide emulsion layer and comprising a transparent support having thereon, in sequence, a neutralizing layer and a timing layer comprising a polymer having the following recurring units:

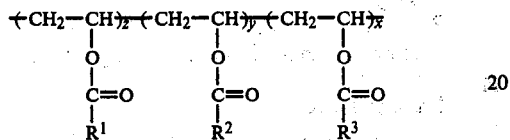

wherein
R¹ is a straight or branched chain alkyl group of from 1 to about 10 carbon atoms or aralkyl group of from about 7 to about 10 carbon atoms;
R² is a substituted or unsubstituted aryl group of from 6 to about 12 carbon atoms;
R³ is a straight or branched aliphatic group having from 1 to about 20 carbon atoms or an aromatic group having from about 6 to about 20 carbon atoms, said group being substituted with at least one free carboxylic acid group, free sulfonic acid group, free phosphoric acid group or salt thereof;
x is from about 1 to about 30 weight percent; and
y+z is from about 99 to about 70 weight percent, the ratio of y:z ranging from about 15:85 to about 70:30; and (c) a rupturable container containing an alkaline processing composition and an opacifying agent, said container being so positioned during processing of said assemblage that a compressive force applied to said container will effect a discharge of the container's contents between said transparent cover sheet and said blue-sensitive silver halide emulsion layer;

said assemblage containing a silver halide developing agent.

20. The assemblage of claim 19 wherein R¹ is methyl, ethyl or propyl, R² is phenyl, chlorophenyl or cyanophenyl and R³ is carboxybutyl, carboxyhexyl or carboxyethyl.

21. The assemblage of claim 19 wherein R¹ is methyl, R² is phenyl and R³ is carboxybutyl.

22. A dye image-receiving element adapted to be permeated by an alkaline processing composition comprising a support having thereon, in sequence, a neutralizing layer, a timing layer comprising a polymer and a dye image-receiving layer, and wherein said polymer comprises:
(i) from about 1 to about 30 weight percent of a hydrophilic component comprising a polymerized monovinyl ester of a polybasic acid, and
(ii) the balance comprising a hydrophobic component comprising a polymerized alkyl vinyl ester and a polymerized aryl vinyl ester.

23. The element of claim 22 wherein said polymer comprises the following recurring units:

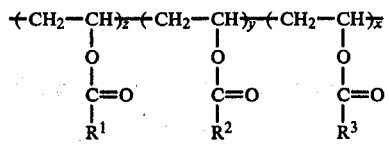

wherein
R¹ is a straight or branched chain alkyl group of from 1 to about 10 carbon atoms or aralkyl group of from about 7 to about 10 carbon atoms;
R² is a substituted or unsubstituted aryl group of from 6 to about 12 carbon atoms;
R³ is a straight or branched aliphatic group having from 1 to about 20 carbon atoms or an aromatic group having from about 6 to about 20 carbon atoms, said group being substituted with at least one free carboxylic acid group, free sulfonic acid group, free phosphoric acid group or salt thereof;
x is from about 1 to about 30 weight percent; and
y+z is from about 99 to about 70 weight percent, the ratio of y:z ranging from about 15:85 to about 70:30.

24. The element of claim 22 wherein R¹ is methyl, ethyl or propyl, R² is phenyl, chlorophenyl or cyanophenyl and R³ is carboxybutyl, carboxyhexyl or carboxyethyl.

25. The element of claim 22 wherein R¹ is methyl, R² is phenyl and R³ is carboxybutyl.

26. A photographic element adapted to be permeated by an alkaline processing composition comprising a support having thereon, in sequence, a neutralizing layer, a timing layer comprising a polymer and at least one photosensitive silver halide emulsion layer having associated therewith a dye image-providing material, and wherein said polymer comprises:
(i) from about 1 to about 30 weight percent of a hydrophilic component comprising a polymerized monovinyl ester of a polybasic acid, and
(ii) the balance comprising a hydrophobic component comprising a polymerized alkyl vinyl ester and a polymerized aryl vinyl ester.

27. The element of claim 26 wherein said polymer comprises the following recurring units:

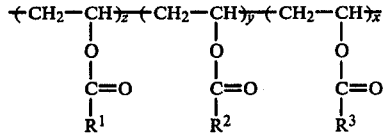

wherein
R¹ is a straight or branched chain alkyl group of from 1 to about 10 carbon atoms or aralkyl group of from about 7 to about 10 carbon atoms;
R² is a substituted or unsubstituted aryl group of from 6 to about 12 carbon atoms;
R³ is a straight or branched aliphatic group having from 1 to about 20 carbon atoms or an aromatic group having from about 6 to about 20 carbon atoms, said group being substituted with at least one free carboxylic acid group, free sulfonic acid group, free phosphoric acid group or salt thereof;
x is from about 1 to about 30 weight percent; and y+z is from about 99 to about 70 weight percent, the ratio of y:z ranging from about 15:85 to about 70:30.

28. The element of claim 26 wherein $R^1$ is methyl, ethyl or propyl, $R^2$ is phenyl, chlorophenyl or cyanophenyl and $R^3$ is carboxybutyl, carboxyhexyl or carboxyethyl.

29. The element of claim 26 wherein $R^1$ is methyl, $R^2$ is phenyl and $R^3$ is carboxybutyl.

30. The element of claim 26 wherein said dye image-providing material is a positive-working redox dye-releaser.

31. The element of claim 30 wherein said positive-working redox dye-releaser is a quinone redox dye-releaser and said photosensitive element contains an incorporated reducing agent.

32. The element of claim 31 wherein said quinone redox dye-releaser has the formula:

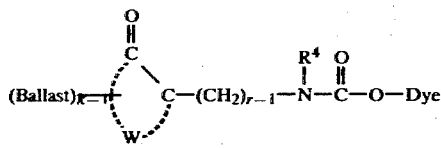

wherein:
Ballast is an organic ballasting radical of such molecular size and configuration as to render said compound nondiffusible in said photosensitive element during development in said alkaline processing composition;
W represents at least the atoms necessary to complete a quinone nucleus;
r is a positive integer of 1 or 2;
$R^4$ is an alkyl radical having 1 to about 40 carbon atoms or an aryl radical having 6 to about 40 carbon atoms;
k is a positive integer of 1 to 2 and is 2 when $R^4$ is a radical of less than 8 carbon atoms; and
Dye is an organic dye or dye precursor moiety.

33. The element of claim 26 which comprises a red-sensitive silver halide emulsion layer having a cyan dye image-providing material associated therewith, a green-sensitive silver halide emulsion layer having a magenta dye image-providing material associated therewith, and a blue-sensitive silver halide emulsion layer having a yellow dye image-providing material associated therewith.

* * * * *